United States Patent
Fujiwara

[11] Patent Number: 6,157,827
[45] Date of Patent: Dec. 5, 2000

[54] VOICE MAIL SYSTEM

[75] Inventor: Ryuhei Fujiwara, Tokyo, Japan

[73] Assignee: NEC Corporation, Tokyo, Japan

[21] Appl. No.: 09/121,270

[22] Filed: Jul. 23, 1998

[30] Foreign Application Priority Data

Jul. 24, 1997 [JP] Japan .................................. 9-198335

[51] Int. Cl.⁷ .................................................. H04M 11/10
[52] U.S. Cl. .................... 455/413; 379/88.22; 379/88.04
[58] Field of Search .............................. 379/88.22, 88.04; 455/413

[56] References Cited

U.S. PATENT DOCUMENTS

| | | | |
|---|---|---|---|
| 6,069,888 | 5/2000 | Larocca ................................. | 379/88.22 |
| 6,069,940 | 5/2000 | Carleton et al. ...................... | 379/88.04 |
| 6,081,593 | 6/2000 | Kim ........................................ | 455/413 |

FOREIGN PATENT DOCUMENTS

| | | |
|---|---|---|
| 585781 | 4/1983 | Japan . |
| 1-245352 | 9/1989 | Japan . |
| 2-240748 | 9/1990 | Japan . |
| 60152167 | 8/1995 | Japan . |

OTHER PUBLICATIONS

Smith, "When Voice Is More Than Voice", Wireless Week, Jul. 12, 1999.

Lopez, "Ericsson Strives To Provide Unified Messaging Mailbox", Wireless Week, Oct. 4, 1999.

*Primary Examiner*—William Cumming
*Attorney, Agent, or Firm*—McGuire Woods, LLP

[57] ABSTRACT

When receiving voice mail data from a server 11, a terminal 13 or 14 stores the voice mail data in a memory. Subsequently, the data is read, converted to a voice and outputted. Furthermore, when inputting a voice mail during the output of the voice, the terminal 13 or 14 generates a signal including a voice mail data reading position of the memory at the time of input, data of the inputted voice mail and a self terminal identification number as a mail editing signal to transmit the signal to the server 11. When receiving the mail editing signal, the server 11 inserts or attaches and re-accumulates the voice mail data in the mail editing signal to a position indicated by the mail editing signal of a memory region of a memory 15 allocated to a transmitting-end terminal.

3 Claims, 4 Drawing Sheets

| ADDRESS | DATA |
|---|---|
| 0 | MS #3 |
| 1 | M1 |
| 2 | m1(1) |
| 3 | m1(2) |
| 4 | m1(3) |
| 5 | – – – |
| 11 | M2 |
| 12 | m2(1) |
| 13 | m2(2) |

FIG.5B SIGNAL a | MS #3 | MAIL REQUEST | M1 |

FIG.5C SIGNAL b | MS #3 | MAIL REQUEST | M1 | m1(1) | m1(2) | m1(3) |

FIG.5D SIGNAL c | MS #3 | MAIL REQUEST | M1 | MS #4 | AD2 | (A) |

FIG.6

| ADDRESS | DATA |
|---|---|
| 1 | M1 |
| 2 | m1(1) |
| 3 | m1(2) |
| 4 | m1(3) |
| 5 | — |

FIG.7

| ADDRESS | DATA |
|---|---|
| 1 | M1 |
| 2 | AD2 |
| 3 | (A) |
| 4 | — |

1

VOICE MAIL SYSTEM

BACKGROUND OF THE INVENTION (i) Field of the Invention

The present invention relates to a voice mail system, particularly to a voice mail system in which terminals are connected via a radio communication network to a server.

(ii) Description of the Related Art

Recently, in a local area network (LAN) or a wide area network (WAN) which is constituted of terminals and a server connected to a network, text electronic mails exchanged between the terminals via the server have been prevailing. Moreover, a document preparation system has been proposed in which the increasing number of electronic mails are efficiently edited and displayed on a display device.

For example, Japanese Patent Application Laid-open No. 245352/1989 discloses a document preparation system which is provided with a server for classifying document preparation data for each terminal and accumulating the data in a storage area to effectively use a kanji dictionary or another resource usable in common and terminals each having a function of reading and editing the data accumulated in the storage area of the server. Moreover, Japanese Patent Application Laid-open No. 240748/1990 discloses an information processing device in which so as to effectively use a data accumulation resource, information data is managed in one way by a server so that the information data in the server can be edited by plural terminals. Furthermore, a data compression system or the like has been recently put to practical use in which a data accumulation resource, a communication resource and the like are effectively used by decreasing redundancy of information data.

In a conventional text electronic mail system, in a case where comments on a received mail are returned or transferred, the comments are attached as reference data partially or entirely to the received mail and returned or transferred.

However, when the returning/transferring is performed by using a radio communication which is generally narrower in communication band and more expensive as compared with a cable communication, the quantity of the applied reference data has an influence on communication cost, but there is only a small necessity to intentionally reduce the applied quantity of the reference data for the saving of the communication cost because the quantity of the text information is small.

Here, it is supposed that the returning/transferring is performed in a voice mail system in which plural terminals are connected via a radio communication network or the like to a server. It is clear that in order to answer or indicate a complicated message, the reference to a received voice is more important rather than the reference to the text document mail. However, even if the quantity of voice data sufficient for providing a meaning as a reference voice is compressed with a compression technique, the quantity of data to be transmitted is remarkably large. This means that the application of the reference data to the communication resource is a large burden on the communication cost in the voice mail system as compared with the text electronic mail system in which comments can be easily attached or inserted to the received text mail and sent. It is especially a large burden in the voice mail system using the radio communication which is largely restricted as the communication resource. This suggests that there should be a similar problem about family data, image data or another information which needs to form a mass of data with a certain size to have a meaning.

Furthermore, in the conventional voice mail system, a voice mail can be transmitted only in one direction, and a bi-directional voice mail cannot be transmitted/received among plural terminals.

SUMMARY OF THE INVENTION

Wherefore, an object of the invention is to provide a voice mail system in which self voice data can be easily attached and returned by eliminating redundant voice data as much as possible.

Another object is to provide a voice mail system in which a bi-directional voice mail communication can be realized.

To attain these and other objects, the present invention provides a voice mail system in which a server is connected via a communication medium to at least one terminal and the server manages a memory for storing plural voice mail data as identifiable files in a memory region allocated to each terminal.

The server has transmission means for, when a mail request is received via the communication medium from the terminal, reading the voice mail data from a memory region of the memory allocated to a transmitting-end terminal to transmit the data to the transmitting-end terminal; and memory control means for, when a mail editing signal is received, inserting or attaching and re-accumulating the voice mail data in the mail editing signal to a position indicated by the mail editing signal of the memory region of the memory allocated to the transmitting-end terminal.

Each terminal has mail request transmission means for transmitting the mail request via the communication medium to the server; memory means for, when the voice mail data is received via the communication medium from the server, storing the received voice mail data; conversion means for converting the received voice mail data read from the memory means into a voice to output the voice; input means for entering optional voice mail data; and signal transmission means for, when a voice mail is inputted by the input means while the voice is outputted from the conversion means, generating a signal including a position of the memory means from which the received voice mail data is read at the time of input, data of the inputted voice mail and a self terminal identification number as the mail editing signal to transmit the mail editing signal via the communication medium to the server.

In the invention, the server manages the memory for storing plural voice mail data as the identifiable files in the memory region allocated to each terminal, and the terminal transmits the mail request signal to the server or generates the voice mail data self-inserted to an optional position of the received voice mail together with the received voice mail data reading position of the memory means corresponding to the inserted position and the self terminal identification number as the mail editing signal to transmit the mail editing signal via the communication medium to the server. Therefore, even when the terminal transmits the received voice mail with a self voice mail added thereto to the server, the voice mail received from the server does not need to be transmitted to the server again, and the voice mail data generated by the terminal can only be transmitted as the mail editing signal to the server.

Moreover, the server of the invention may further has means for, when the mail editing signal is received, after the memory control means inserts or applies and re-accumulates the voice mail data in the mail editing signal to the position indicated by the mail editing signal of the memory region of the memory allocated to the transmitting-end terminal, transmitting the re-accumulated voice mail data of the memory region to a terminal of a transmission destination in the mail editing signal.

In the invention, a first terminal having transmitted the mail editing signal can transmit via the server to a second terminal the voice mail data which is constituted by inserting or attaching the voice mail data entered by the first terminal to the voice mail data addressed to the first terminal. Therefore, when the second terminal receives and regenerates the voice mail data, a voice of a first person of the voice mail received by the first terminal with a voice of a second person or user of the first terminal added thereto is heard. Specifically, a conversation between the first person and the second person is made. At this time, the voice information in the mail editing signal transmitted by the first terminal to the server is only the voice information of the second person, and the voice information of the first person is not transmitted. Therefore, in the invention, a double or more efficient conversational communication is permitted as the case may be, as compared with a case where the voice information of the first and second persons are added and communicated.

BRIEF DESCRIPTION OF THE DRAWINGS

FIGS. 5B, 5C and 5D are diagrams showing formats of signals a, b and c of FIG. 5A, respectively;

FIG. 6 is a diagrammatic view showing an example of data stored in a received data area of a memory 47 of FIG. 4; and FIG. 7 is a diagrammatic view showing an example of data stored in a transmitted data area of the memory 47 of FIG. 4.

DETAILED DESCRIPTION OF THE PREFERRED EMBODIMENTS

Figures 1, 2:
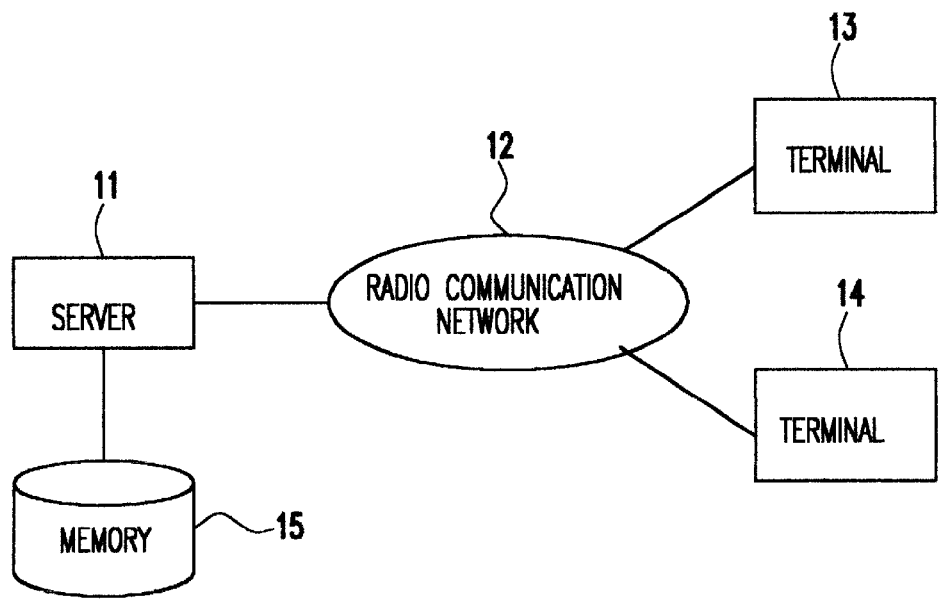
FIG. 1 is a block diagram showing a constitution of a voice mail system according to the invention.
FIG. 2 is a diagrammatic view showing an example of data stored in a memory region of a memory allocated to a terminal 13 shown in FIG. 1.

Embodiments of the invention will be described with reference to the accompanying drawings. FIG. 1 is a block diagram of a voice mail system according to an embodiment of the invention. As shown in FIG. 1, the voice mail system of the invention is constituted of a server 11 for managing a memory 15, terminals 13 and 14 and a radio communication network 12 for connecting the server 11 to the terminals 13 and 14.

The memory 15 is a memory device for storing plural voice mail data as identifiable files in a memory region allocated to each terminal, e.g., a magnetic disc device, and stores a voice mail in, for example, a format shown in FIG. 2. In FIG. 2, a terminal identification number MS#3 is stored in a top address (address 0 in FIG. 2) of the memory region allocated to the terminal 13, and a mail identification number M1 or M2 of a mail is stored in a top of a memory region (every ten addresses in FIG. 2) allocated to each mail. Additionally, in FIG. 2, ml(1), ml(2), ml(3) . . . denote voice data of a first mail (voice mail data), and m2(1), m2(2) . . . denote voice mail data of a second mail.

Figures 3, 4:
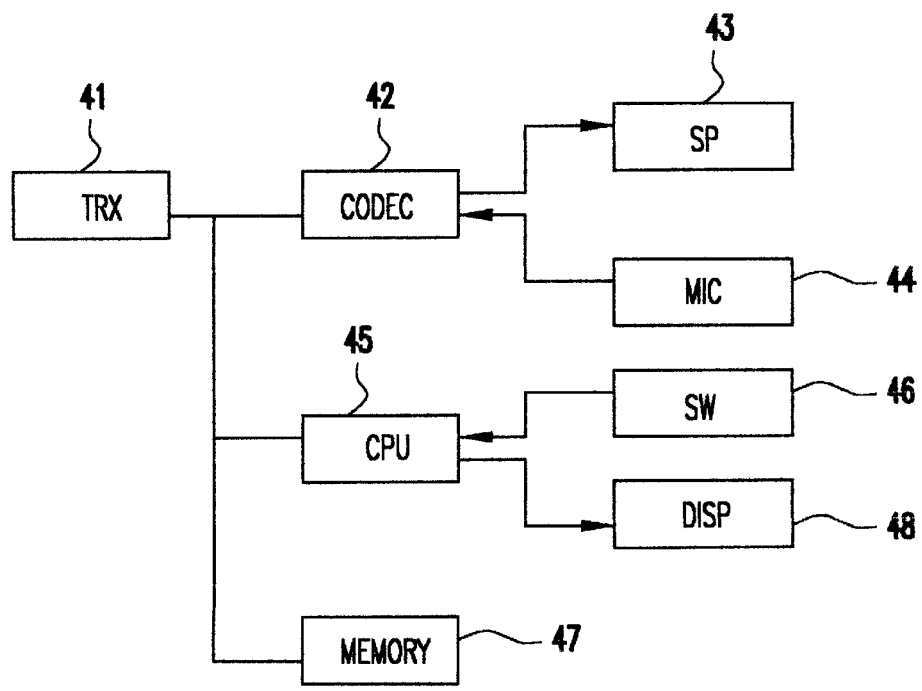
FIG. 3 is a diagrammatic view showing an example of data stored in a memory region of a memory allocated to a terminal 14 shown in FIG. 1.
FIG. 4 is a block diagram showing a constitution of the terminal of FIG. 1.

FIG. 4 is a block diagram showing an embodiment of the terminal 13 or 14 of FIG. 1. Each terminal is constituted of a radio section TRX 41, a voice code decoder CODEC 42, a loudspeaker SP 43, a microphone MIC 44, a central processing unit CPU 45, an operation switch SW 46, a memory 47 and a display section DISP 48.

Operation of the terminal of FIG. 4 will be described.

The CPU 45 performs a radio communication with the server 11 through the radio section 41. At this time, transmitted/received voice mail data is temporarily stored in the memory 47. When the CPU 45 reads the voice mail data from the memory 47, the voice mail data is successively read from the memory 47 and sent to CODEC 42. The CODEC 42 decodes and converts the voice mail data as a digital signal to an analog voice signal to supply the signal to the loudspeaker 43.

Moreover, in a case where the voice mail data is transmitted, after a voice signal which is obtained by acoustic-electric converting a voice transmitted by the microphone 44 is coded to a digital signal or voice mail data by CODEC 42, the voice mail data is successively accumulated to an address of the memory 47 designated by CPU 45. Subsequently, the voice mail data temporarily accumulated in the memory 47 is sent to the radio section 41 for radio transmission to the server 11.

The operation switch 46 is connected to CPU 45, and is operated by a person to instruct CPU 45 to fetch a mail, record a voice, transmit a mail or otherwise. The display section 48 displays results of operation of CPU 45 by means of the operation switch 46 or the like by the control of CPU 45.

Figure 5A:
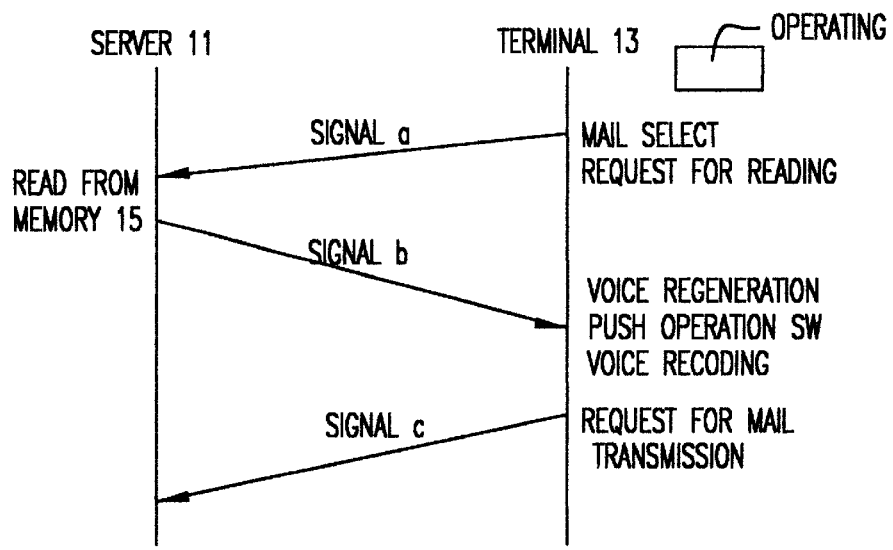
FIG. 5A is a sequence diagram showing operation of the system of FIG. 1.

Operation of the embodiment shown in FIG. 1 will be described. When the terminal 13 fetches the mail from the server 11, first mail reception information notified beforehand by the server 11 is displayed on the display section 48, and the identification number of the mail to be fetched is selected and determined with the operation switch 46 to request for mail selecting/reading. Then, as shown in a sequence diagram of FIG. 5A, the terminal 13 radio-transmits a signal a via the radio communication network 12 to the server 11. As shown in FIG. 5B, the signal a has a format which is obtained by synthesizing a terminal identification number 51 indicative of a transmitting end (the identification number MS#3 of the terminal 13), a control code 52 indicative of a mail request and a mail identification number 53 (M1) selected by the operation switch 46 in a time series, and is generated by CPU 45.

When receiving the signal a, the server 11 decodes the signal a and reads the voice mail data subsequent to the mail identification number M1 in the memory region allocated to the terminal identification number MS#3 of the memory 15. As shown in FIG. 2, the voice mail data subsequent to the mail identification number M1 of the memory region allocated to the terminal identification number MS#3 of the memory 15 are ml(1), ml(2) and ml(3) stored in addresses 2 to 4. Subsequently, as shown in FIG. 5A, the server 11 radio-transmits a signal b having the voice mail data ml(1), ml(2) and ml(3) via the radio communication network 12 to the terminal 13.

As shown in FIG. 5C, the signal b has a format which is obtained by synthesizing a terminal identification number 54 indicative of a transmission destination (the identification number MS#3 of the terminal 13), a control code 55 indicative of a mail reading, a received mail identification number 56 (M1) and voice mail data 57 (ml(1), ml(2) and ml(3) described above) in a time series.

The CPU 45 of the terminal 13 identifies the received signal b as a signal addressed to itself based on the terminal identification number 54 of the signal b, and stores the mail identification number M1 and the voice mail data ml(1) to ml(3) subsequent to the control code 55 indicative of the mail reading in the signal b into and successively from a predetermined address 1 of the memory 47 shown in FIG. 6. Thereafter, CPU 45 reads the voice mail data ml(1) to ml(3) from the memory 47 in address sequence to supply the data to CODEC 42. The voice mail data ml(1) to ml(3) are decoded by CODEC 42, and emitted as a voice mail from the loudspeaker 43.

A case where while a user of the terminal 13 is listening to the voice mail, regeneration of the voice mail is temporarily halted to record a self voice as a reply to be returned will be described. For example, at a point when the terminal 13 emits the voice mail data ml(1) in the address 2 of the memory 47 as a sound from the loudspeaker 43, the user starts pushing down the operation switch 46. In this case, CPU 45 of the terminal 13 secures a transmission memory area in the memory 47 and, as shown in FIG. 7, stores the mail identification number M1 into a top of the transmission memory area and a reading address AD2 (address indicative of a position relative to the address 1 storing the mail identification number M1 shown in FIG. 6) of the memory 47 at the time of the pushing of the operation switch 46 into the subsequent address.

Subsequently, successively from the address next to the address storing the address AD2 of the transmission memory area of the memory 47, CPU 45 stores a voice signal which is entered via the microphone 44 by the user and digitized as the voice mail data by CODEC 42, until the pushing of the operation switch 46 is released. Here, the user of the terminal 13 stores the voice mail data diametrically shown by (A) in FIG. 7A into an address next to the address storing the address AD2 of the transmission memory area of the memory 47.

Subsequently, if the user releases the pushed operation switch 46, CPU 45 resumes the halted reading of the voice mail data stored in the memory 47 from the address 3 next to the interrupted address 2. Thereby, as shown in FIG. 6, the voice mail data is read in sequence: ml(2); then ml(3). Additionally, in a case where the operation switch 46 is again pushed while the user of the terminal 13 is reading the voice mail data ml(2) or ml(3), another data accumulation area is secured in the transmission memory area shown in FIG. 7, and the voice mail data is accumulated in the same manner as aforementioned.

In a case where the user of the terminal 13 finishes recording his reply to transmit a mail including the received voice mail and his reply to another terminal 14, the user enters an identification number of a transmission destination or MS#4 of the terminal 14 with the operation switch 46. Then, as shown in FIG. 5A, CPU 45 of the terminal 13 radio-transmits a signal c via the radio communication network 12 to the server 11.

As shown in FIG. 5D, the signal c has a format which is obtained by synthesizing a terminal identification number 51 indicative of a transmitting end (the identification number MS#3 of the terminal 13), a control code 58 indicative of a mail editing, a transmission memory area mail identification number 59 (M1 in FIG. 7), a terminal identification number 60 indicative of a transmission destination (the identification number MS#4 of the terminal 14), a reading address number 61 (AD2 in FIG. 7) of the memory 47 at a time when the operation switch 46 is pushed and voice mail data 62 (the aforementioned (A)) in a time series.

The server 11 receives and decodes the signal c, starts reading the voice mail data successively from an address subsequent to the mail identification number M1 of the memory region allocated to the terminal identification number of the memory 15 shown in FIG. 2, stops reading in a position of the address number AD2, and inserts the voice mail data 62, i.e., (A) in the signal c received from the terminal 13. After the insertion of the voice mail data 62 is completed, the reading of the voice mail data is restarted from an address next to the address of the address number AD2 of the memory 15.

In this manner, the server 11 successively accumulates the read data into a memory region of the memory 15 allocated to the terminal identification number MS#4 of the terminal 14. Thereby, in the memory region allocated to the terminal identification number MS#4 of the memory 15, as shown in FIG. 3, the voice mail data (A) is inserted and written between the voice mail data ml(1) and ml(2).

Thereafter, the server 11 radio-transmits via the radio communication network 12 to the terminal 14 a signal having a format which is constituted by synthesizing a terminal identification number indicative of a transmission destination (the identification number MS#4 of the terminal 14), a control code indicative of a mail reading and the mail identification number M1 or voice mail data read from the memory region allocated to the terminal identification number MS#4 of the memory 15 in FIG. 3 in a time series.

When the terminal 14 receives and decodes the signal, the voice mail is received in the same manner as when the signal b of the terminal 13 is received, so that a voice mail of the voice mail data ml(1) to ml(3) received by the terminal 13 can be heard while a voice mail of the voice mail data (A) of the user of the terminal 13 is inserted between voice mails of the voice mail data ml(1) and ml(2).

In practical modes for use, in a case where the voice mail received by the terminal 13 is originally sent from the terminal 14, the voice mail can be used in a conversational format of questions and answers. Alternatively, in a case where the voice mail received by the terminal 13 is not related with the terminal 14, the mail can be used as an indication with comments.

As aforementioned, in the embodiment, since the data stored in the memory 15 managed by the server 11 can be shared for use by the terminals 13 and 14, transmission from the terminals 13 and 14 can be limited only to the information generated in a self station. Therefore, the same information is prevented from passing through the radio communication network 12 many times, and a reply or an indication can be added.

The present invention is not limited to the embodiment described above. For example, only one terminal may be connected to the server, or the server and the terminal may be connected via a communication network using a medium of infrared ray. Furthermore, the operation switch 46 is not limited to a manual switch, and may be a known switch of speech recognition.

As aforementioned, according to the invention, since the server manages the memory for storing plural voice mail data as identifiable files in the memory region allocated to each terminal, even in the case where the voice mail received by the terminal is transmitted to the server by adding self voice mail data, the voice mail received by the server does not need to be sent to the server again. The voice mail data generated by the terminal can only be transmitted as the mail editing signal to the server. Therefore, the same mail data is prevented from being transmitted/received between the server and the same terminal many times. Consequently, a remarkably efficient communication can be realized in a communication network which has a slower transmission rate and is more expensive as compared with a cable network.

Moreover, according to the invention, the first terminal having sent the mail editing signal can transmit via the server to the second terminal the voice mail data which is constituted by inserting or applying the voice mail data entered by the first terminal to the voice mail data addressed to the first terminal. Therefore, a reply or an indication can be added to the voice mail which can be heretofore transmitted only in one direction. A gentle and inventive communication service of "non-real-time conversation" can be realized on a reception side.

What is claimed is:

1. A voice mail system in which a server is connected via a communication medium to at least one terminal and said server manages a memory for storing plural voice mail data as identifiable files in a memory region allocated to each said terminal, said server comprising:
    transmission means for, when a mail request is received via said communication medium from said terminal, reading the voice mail data from a memory region of said memory allocated to a transmitting-end terminal to transmit the data to the transmitting-end terminal; and
    memory control means for, when receiving a mail editing signal, inserting or attaching and re-accumulating the voice mail data in the mail editing signal to a position indicated by the mail editing signal of the memory region of said memory allocated to the transmitting-end terminal, said terminal comprising:
    mail request transmission means for transmitting the mail request via said communication medium to said server;
    memory means for, when the voice mail data is received via said communication medium from said server, storing the received voice mail data;
    conversion means for converting the received voice mail data read from the memory means into a voice to output the voice;
    input means for entering optional voice mail data; and
    signal transmission means for, when a voice mail is inputted by the input means while the voice is outputted from the conversion means, generating a signal including a position of the memory means from which the received voice mail data is read at the time of input, data of said inputted voice mail and a self terminal identification number as said mail editing signal to transmit the mail editing signal via said communication medium to said server.

2. The voice mail system according to claim 1 which further comprises means for, when said mail editing signal is received, after said memory control means inserts or attaches and re-accumulates the voice mail data in said mail editing signal to the position indicated by the mail editing signal of the memory region of said memory allocated to the transmitting-end terminal, transmitting the re-accumulated voice mail data of the memory region to a terminal of a transmission destination in the mail editing signal.

3. The voice mail system according to claim 2 wherein said communication medium is a communication network by means of radio or infrared rays.

* * * * *